US008353311B2

(12) United States Patent
Rigamonti et al.

(10) Patent No.: US 8,353,311 B2

(45) Date of Patent: Jan. 15, 2013

(54) ANTI-FLOODING DEVICE

(75) Inventors: Fausto Rigamonti, Valduggia (IT); Nicola Musano, Serravalle Sesia (IT)

(73) Assignee: Officine Rigamonti S.p.A., Valduggia, VC (IT)

(*) Notice: Subject to any disclaimer, the term of this patent is extended or adjusted under 35 U.S.C. 154(b) by 1106 days.

(21) Appl. No.: 12/239,444

(22) Filed: Sep. 26, 2008

(65) Prior Publication Data

US 2009/0250928 A1 Oct. 8, 2009

(30) Foreign Application Priority Data

Apr. 4, 2008 (IT) .............................. MI2008A0590

(51) Int. Cl.
*F16K 17/30* (2006.01)
*F16K 17/22* (2006.01)

(52) U.S. Cl. .................. 137/498; 137/512.1; 137/512.3; 137/513; 137/517; 138/46

(58) Field of Classification Search .................. 137/460, 137/498, 512, 512.1, 512.3, 513, 516.25, 137/516.27, 517; 138/46

See application file for complete search history.

(56) References Cited

U.S. PATENT DOCUMENTS

| | | | | |
|---|---|---|---|---|
| 383,877 | A * | 6/1888 | Gale et al. | 137/517 |
| 2,357,321 | A * | 9/1944 | Fuller | 137/460 |
| 2,526,346 | A * | 10/1950 | Goldinger | 137/512.1 |
| 2,925,826 | A * | 2/1960 | Streeter | 137/517 |
| 3,122,162 | A * | 2/1964 | Sands | 137/498 |
| 3,326,233 | A * | 6/1967 | Perruzzi | 137/460 |
| 3,438,392 | A * | 4/1969 | Wilson | 137/517 |
| 4,699,166 | A * | 10/1987 | Gold et al. | 137/517 |
| 5,215,113 | A * | 6/1993 | Terry | 137/517 |
| 6,216,741 | B1 | 4/2001 | Aarntzen | |
| 2004/0182442 | A1 | 9/2004 | Frampton et al. | |
| 2005/0199289 | A1 | 9/2005 | McDonald et al. | |

FOREIGN PATENT DOCUMENTS

EP 0 969 233 A1 1/2000

OTHER PUBLICATIONS

Chinese Office Action for Chinese patent application No. 200810213445.2 mailed May 3, 2012 (English Translation Provided).

* cited by examiner

*Primary Examiner* — John Rivell

(74) *Attorney, Agent, or Firm* — Merchant & Gould P.C.

(57) ABSTRACT

An anti-flooding device (10) including a duct (12) for passage of a flow of liquid, and a limiter (14) inserted along the duct (12) for passage of liquid and defining a section for passage of the liquid that decreases progressively as the flowrate of liquid increases, with closing of the duct (12) once a given threshold flowrate has been reached. The limiter (14) has at least one male element (18) and at least one female element (20), which are mobile with respect to one another so that they slide into one another as the flowrate of liquid increases. Progressive insertion into one another of the male element (18) and the female element (20) defines the section of passage. The male element (18) and female element (20) are shaped with respect to one another so as to reduce the section of passage as the flowrate increases, with closing of the duct (12) for passage of liquid as soon as a given threshold flowrate is reached.

19 Claims, 4 Drawing Sheets

46 F 44 32 12a 12 48 10 18 22 14 20 26 24 36 28 34 42 30 40 12b 38

ANTI-FLOODING DEVICE

This application claims benefit of Serial No. MI2008A000590, filed 4 Apr. 2008 in Italy and which application is incorporated herein by reference. To the extent appropriate, a claim of priority is made to the above disclosed applications.

BACKGROUND OF THE INVENTION

Forming the subject of the present invention is an anti-flooding device, suitable, for example, for being interposed in the connection of a water-using apparatus to a water-supply system.

According to a possible form of use, the present invention regards an anti-flooding device suitable for being used in the connection of a water dispenser to the water-supply system. In some examples of use, the present anti-flooding device can be used at inlet to dispensers for drinking water, coffee machines, or beverage dispensers in general, in particular when they comprise a direct connection to the water-supply system.

In general, the present anti-flooding device is suitable for being used in connection systems that envisage the use of mobile connections, for example, fast couplings, and flexible pipes made of PE, PEX, etc. or in general in all those applications where there exists the danger of the pipe for connection with the water-supply system sliding out or undergoing failure. In fact, such systems are guaranteed against the possibility of the pipe sliding out in "normal" conditions of use. In operation, there could, however, arise exceptional situations, such as a clumsy movement of the dispenser being made or an involuntary pulling action being exerted on the pipe. In this case, the fast couplings do not present characteristics of resistance such as to withstand similar stresses, with the result that the pipe slides out.

There is hence particularly felt the need to obtain a substantial instantaneous interruption of the flow in the case where the flowrate increases above a threshold value.

Known devices, in particular in the sector of dispensers, comprise flowmeters, which perform further functions in addition to that of closing the duct for passage of the liquid in the case of failure or sliding-out of the couplings. On account of their intrinsic operation, said devices do not enable instantaneous closing of the duct given that they intervene only after passage and corresponding counting of a given amount of liquid in unit time.

SUMMARY OF THE INVENTION

The purpose of the present invention is to devise and provide an anti-flooding device that will enable the drawbacks referred to above in relation to the known art to be at least partially overcome.

In particular, the task of the present invention is to provide an anti-flooding device that will intervene instantaneously, preventing outlet of liquid in the case of failure or malfunctioning.

BRIEF DESCRIPTION OF THE DRAWINGS

Further characteristics and advantages of the device according to the invention will emerge from the description provided hereinafter of preferred examples of embodiment, which are provided purely by way of indicative and non-limiting example, with reference to the attached plates of drawings, in which.

DETAILED DESCRIPTION OF THE PREFERRED EMBODIMENTS

Figure 1:
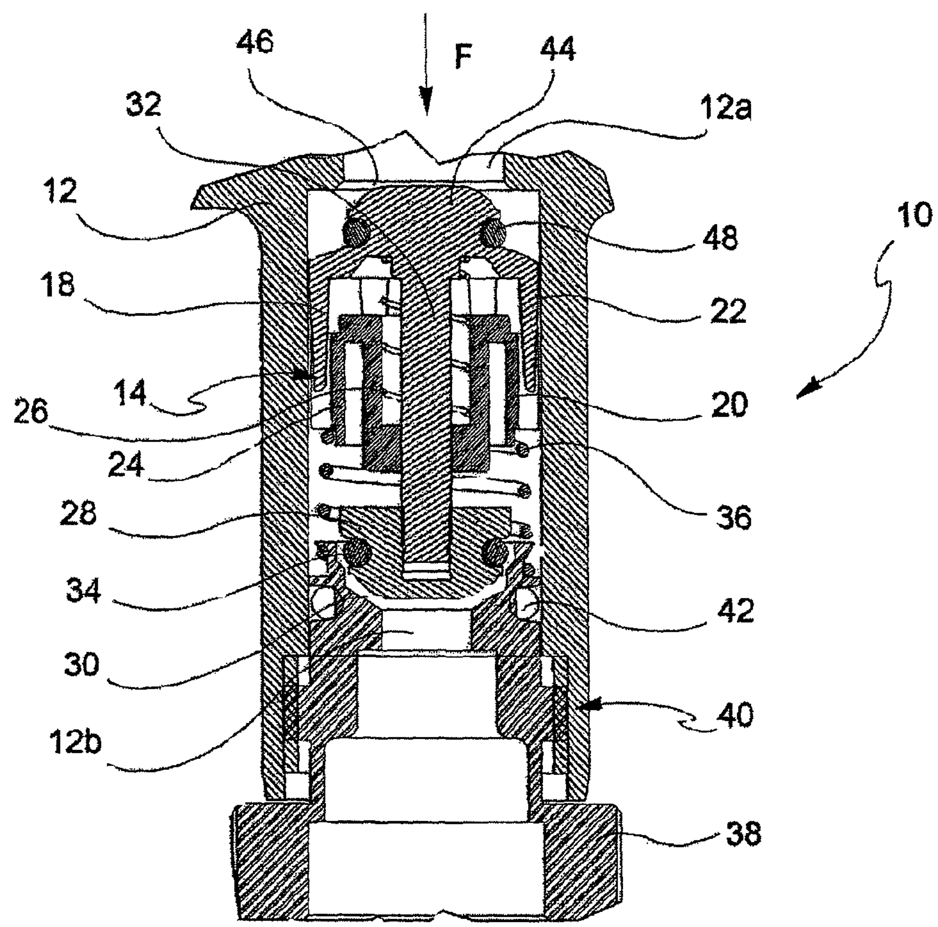
FIG. 1 is a schematic view in longitudinal section of an anti-flooding device according to the invention.

With reference to the above figures, designated as a whole by 10 is an anti-flooding device according to the invention. The device 10 comprises a duct 12 for passage of a flow of liquid. The duct 12 for passage of liquid has an inlet passage 12*a* and an outlet passage 12*b*. Designated by F is the direction of flow of liquid in conditions of normal use of the apparatus downstream. Said direction defines also a longitudinal direction of the duct. The duct 12 preferably defines a calibrated external body with cylindrical longitudinal section.

Also provided are limiting means 14 inserted along the duct 12 and defining a section for passage of the liquid that decreases progressively as the flowrate of liquid increases, until closing of the duct occurs once a given threshold flowrate has been reached.

Advantageously, the limiting means comprise at least one male element 18 and at least one female element 20, which are mobile with respect to one another so that they slide into one another as the flowrate of liquid increases so that progressive insertion into one another of the male element 18 and the female element 20 will define the section of passage.

According to a possible embodiment, the male element 18 comprises at least one wedge 22 with cross section that increases in the longitudinal direction of the duct, in the opposite direction to the normal flow of liquid. In particular, the male element 18 comprises a plurality of wedges 22, arranged along an outer perimeter of the male element itself. The male element 18 is preferably obtained with a substantially axisymmetrical structure. In the example illustrated, the male element 18 has an axisymmetrical structure, and six wedges 22 are provided distributed along the outer circumference of the male element itself. According to a possible embodiment, the wedges 22 are shaped like a cone or have a semi-circular cross section.

According to a possible embodiment, the female element 20 comprises at least one slot 24 suitable for receiving the respective wedge 22 of the male element 18. Advantageously, the slot 24 extends in the longitudinal direction of the duct 12 for passage of liquid.

In the case where the corresponding wedge 22 has a cross section increasing in a direction opposite to the normal flow of liquid, the slot 24 can present a constant cross section in the longitudinal direction of the duct 12. Advantageously, the at least one slot can be obtained as a recess made in the external surface of the female element 20, open in the direction of the internal walls of the duct 12 for passage of liquid. Preferably, two or more slots 24 are provided, made in the external surface of the female element 20. Advantageously, the slot 24 has the shape of a circular sector.

According to a possible embodiment, the external dimension (external diameter in the case of an axisymmetrical female element) of the female element 20 is slightly smaller than the minimum section defined by the duct 12 for passage of liquid.

According to a possible embodiment, the female element 20 is made with an axisymmetrical structure. Preferably, the female element 20 made with an axisymmetrical structure 20 comprises two or more slots 24 distributed along the external cylindrical surface of the female element itself.

In conditions of normal use of the apparatus downstream of the anti-flooding device, the male element 18 and the female element 20, with the corresponding elastic retention element set in between, are partially inserted the former into the latter in a condition of dynamic balance that determines a free section 16 (FIG. 4) between each slot, the corresponding wedge, and the internal walls of the duct.

Figure 4:
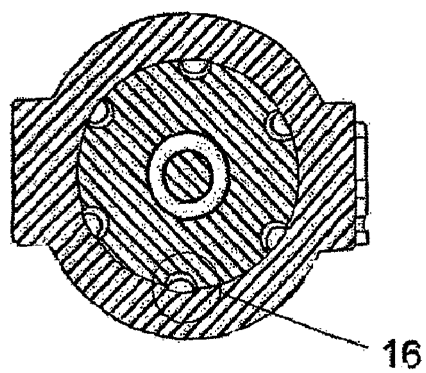
FIG. 4 is a schematic view of the cross section IV-IV of FIG. 3.
Figure 5:
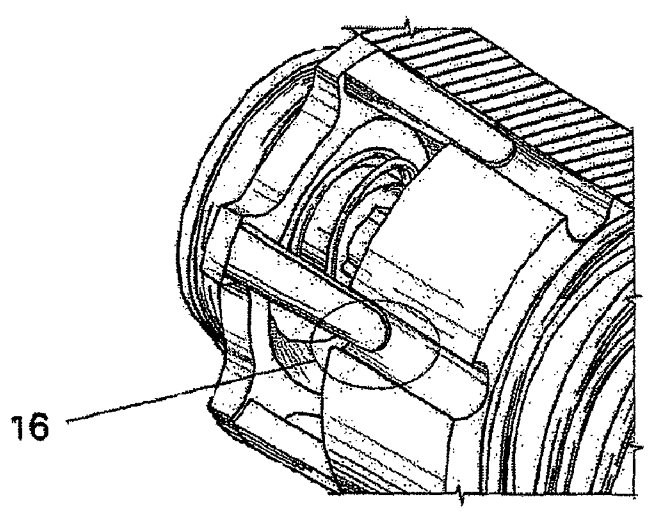
FIG. 5 is a schematic perspective view of a detail of the cross section of FIG. 4.
Figure 7:
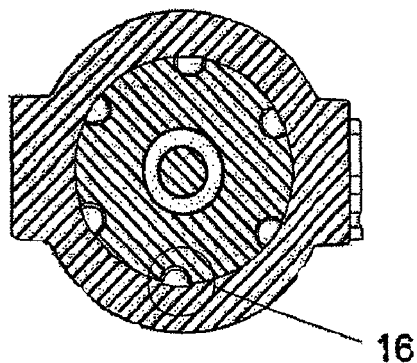
FIG. 7 is a schematic view of the cross section VII-VII of FIG. 6.
Figure 8:
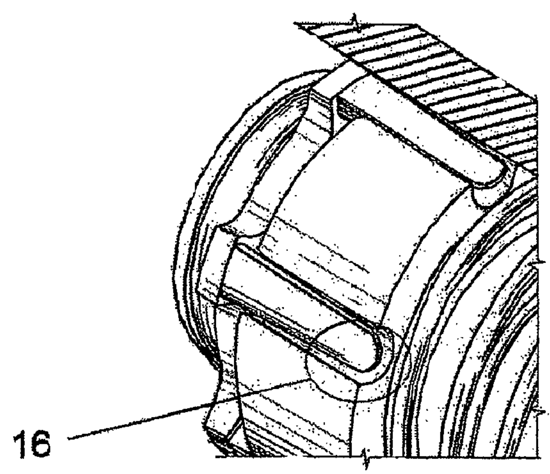
FIG. 8 is a schematic perspective view of a detail of the cross section of FIG. 7.

With reference to the embodiment illustrated in the figures, the section of passage of liquid is defined by the sum of the free sections 16 defined between each slot 24, the corresponding wedge 22, and the internal wall of the duct 12 for passage of liquid in a given cross section of the limiting means 14, as is illustrated, for example, in FIG. 4 and FIG. 7.

In general, the male element 18 and the female element 20 are shaped with respect to one another in such a way as to reduce the section of passage as the flowrate of liquid increases, with closing of the duct 12 as soon as a given threshold flowrate is reached.

According to a possible embodiment, an elastic retention element 26 is set between the male element 18 and the female element 20 of the limiting means 14. Advantageously, both the male element 18 and the female element 20 define a corresponding seat for housing the elastic retention element. With reference to the figures illustrated, the elastic retention element is obtained by means of a helical spring.

According to a possible embodiment, the anti-flooding device further comprises an anti-flooding open/close element 28, advantageously associated to the limiting means 14, and an anti-flooding seat 30, arranged along the duct 12 for passage of liquid. The anti-flooding open/close element 28 is made in such a way as to close the anti-flooding seat 30 under the action of the thrust exerted by the limiting means 14 once the threshold flowrate is exceeded. Advantageously, the anti-flooding open/close element 28 is associated to one between the male element 18 and female element 20, preferably by means of a stem 32 set longitudinally along the duct 12 for passage of liquid. In particular, the anti-flooding open/close element 28 is connected to the male element 18, which is thus mobile with respect to the female element 20, until the threshold flowrate is reached. In this case, the stem 32 traverses the female element 20 in the longitudinal direction.

In the embodiment illustrated in the figures, the anti-flooding open/close element 28 houses a gasket or O-ring 34 to ensure a better seal against the walls of the anti-flooding seat 30.

According to the example illustrated in the figures, the limiting means 14 and the anti-flooding open/close element 28 constitute a sort of cartridge that can be inserted in the duct 12 for passage of liquid.

According to a possible embodiment, the anti-flooding device further comprises an anti-flooding elastic element 36, which acts so as to keep the anti-flooding seat 30 open during normal operation of the apparatus set downstream. Advantageously, the anti-flooding elastic element 36 is set between a portion of the duct 12 and the limiting means 14, preferably the female element 20 of the limiting means 14.

According to a possible embodiment, the anti-flooding elastic element 36 is pre-loaded in a resting position or a position of normal operation of the apparatus set downstream. Advantageously, the anti-flooding elastic element 36 has a greater stiffness than the elastic retention element 26.

According to a possible embodiment, the anti-flooding device further comprises a valve 38, associated to a downstream end of the duct 12 for passage of liquid and preferably defining the anti-flooding seat 30. Advantageously, the position of the valve can be adjustable along the duct 12, for example by means of a threaded coupling 40. According to a possible embodiment, the valve houses a gasket or O-ring 42 to ensure a better seal against the intimal walls of the duct 12. Advantageously, the anti-flooding elastic element 36 is set between the limiting means 14 and the valve 38.

According to a possible embodiment, the limiting means 14 comprise a retention open/close element 44. In addition, the duct 14 comprises a retention seat 46 set upstream with respect to the limiting means 14 with reference to the normal flow of liquid in such a way that the retention open/close element 44 is designed to close the retention seat 46 once the flow of liquid ceases. With reference to the embodiment illustrated in the figures, the retention open/close element 44 is connected, preferably by being made of a single piece therewith, to the male element 18 of the limiting means 14.

According to the embodiment illustrated in the figures, the retention open/close element 44 houses a gasket or O-ring 48 to ensure a better seal against the walls of the retention seat 46.

Advantageously, the anti-flooding open/close element 28 and the retention open/close element 44 are connected to one another preferably by means of the stem 32.

According to a possible embodiment, the duct 12 for passage of liquid comprises means for engagement to a system, comprising, for example, threaded attachments or other joining means.

Figure 10:
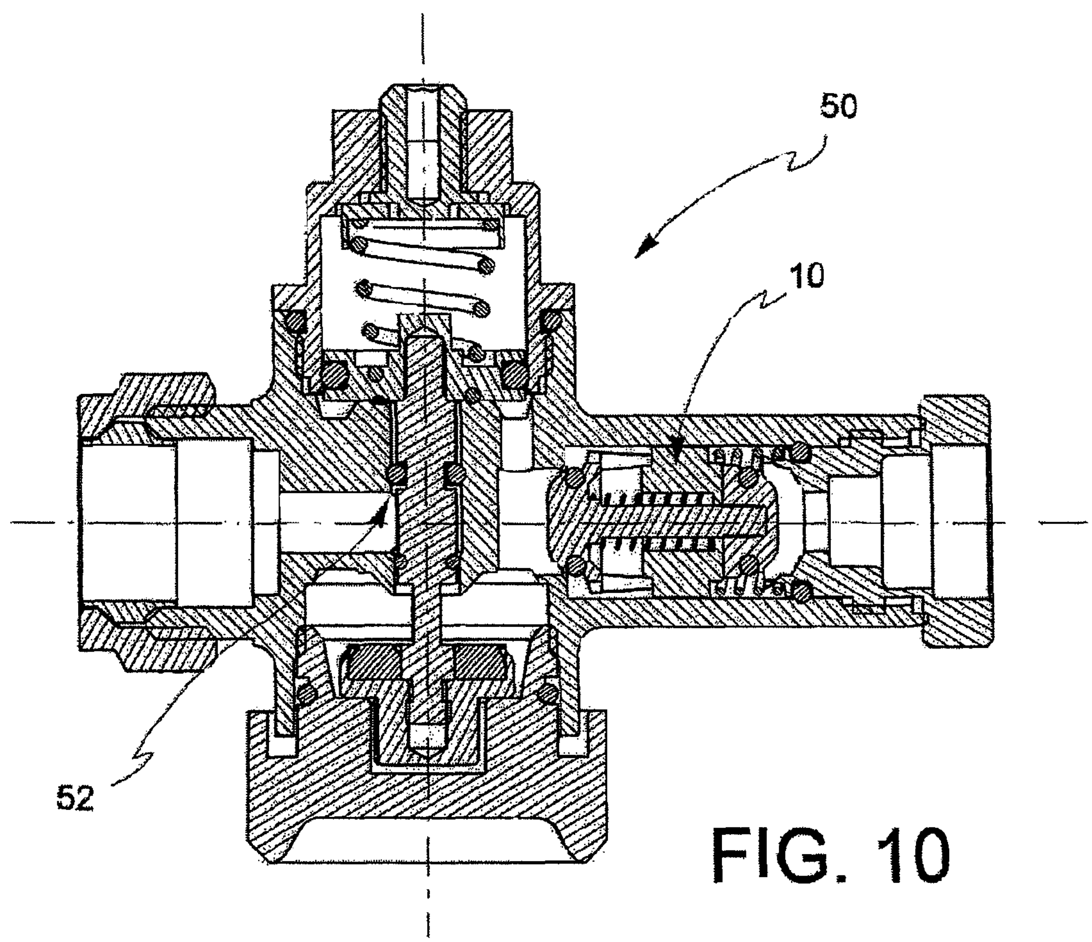
FIG. 10 is a schematic view in longitudinal section of a connection device comprising an anti-flooding device according to the invention.

According to a possible embodiment, the anti-flooding device according to the present invention can be used in a connection device 50 for a dispenser of drinking water or the like. In this case, it is advantageously envisaged that the connection device will further comprise a pressure limiter 52. An example of such a connection device is illustrated in FIG. 10.

Operation of the anti-flooding device referred to above is described hereinafter with reference to the attached figures.

The main function of the aforesaid device is the anti-flooding function, which enables immediate interruption of the flow of liquid, in particular water, in the case where the pipe for delivery to the final dispensing device slides out and/or undergoes failure.

Figure 2:
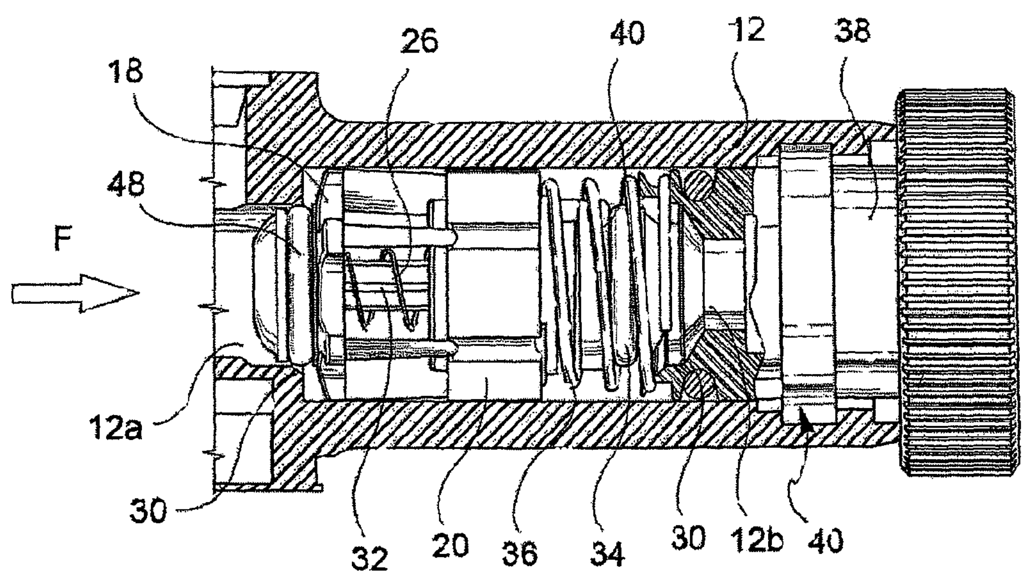
FIG. 2 is a partially sectioned schematic view of an anti-flooding device according to the invention in a possible condition of operation.

FIG. 2 illustrates the initial condition of the anti-flooding device, in which the retention open/close element 44 is in contact with the retention seat 46. The elastic retention element 26 keeps the male element 18 and the female element 20 at a distance from one another. In addition, the elastic anti-flooding element 36, possibly pre-loaded, keeps the limiting means 14 and the anti-flooding open/close element 28 away from the anti-flooding seat 30.

The liquid (water) enters the duct 12 in the direction of the arrow F, through the inlet passage 12*a*, and exerts on the male element 18 a pressure sufficient to overcome the countering thrust of the elastic retention element 26 so causing displacement of the ensemble made up of the male element and the anti-flooding open/close element, which are fixedly constrained to one another by means of the stem 32. In addition, the male element 18 slightly approaches the female element 20, whilst its wedges insert into the respective slots.

Owing to this first displacement, the water can flow through the slots 24 of the female element 20, which are only partially obstructed by the wedges 22 of the male element, in relative equilibrium.

This partial obstruction is defined by a dynamic balance between the male element and the female element, which delimits a given free section 16 for each slot, in a region corresponding to a given cross section. The sum of the free sections determines the section of passage of the flow of liquid (water).

Figure 3:
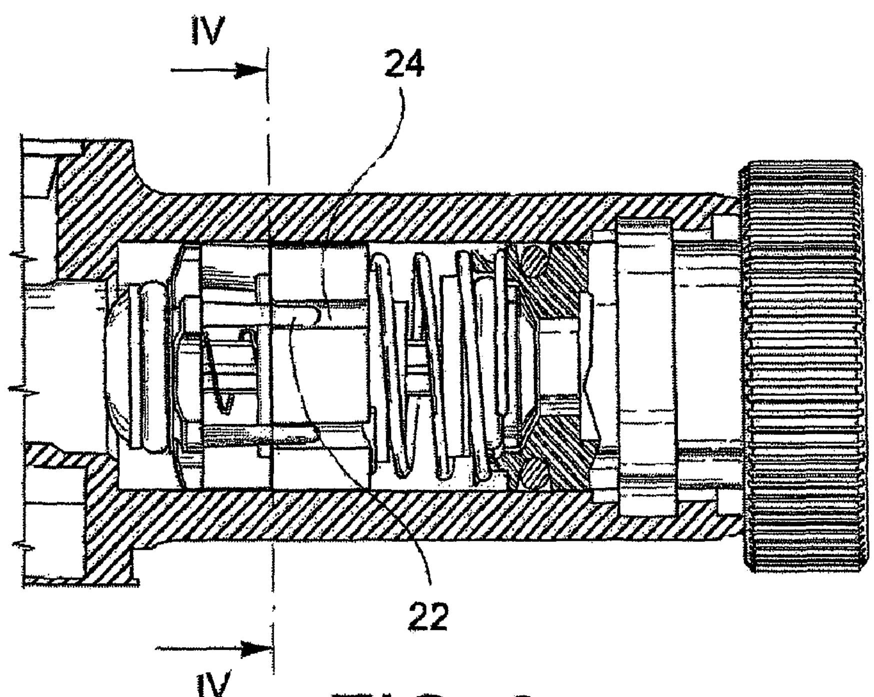
FIG. 3 is a partially sectioned schematic view of an anti-flooding device according to the invention in a possible condition of operation.

FIG. 3 illustrates the position of the device of FIG. 2 during normal operation of the apparatus set downstream of the anti-flooding device, i.e., in the absence of failure or malfunctioning.

In this condition, both the retention seat 46 and the anti-flooding seat 30 are open, and the corresponding open/close elements are moved away from each seat in dynamic equilibrium as a result of the flow of liquid.

Figure 6:
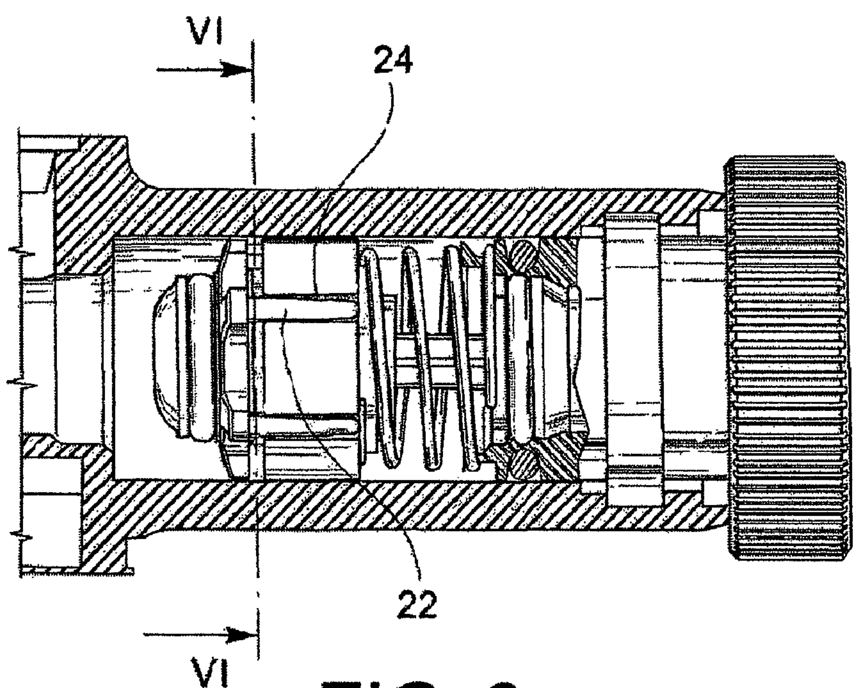
FIG. 6 is a partially sectioned schematic view of an anti-flooding device according to the invention in a possible condition of operation.

In the case where the flowrate exceeds the threshold value, the force exerted on the male element 18 and on the anti-flooding open/close element 28 overcomes completely the thrust of the elastic retention element 26. The wedges 22 of the male element 18 completely enter the respective slots 24 of the female element 20, and completely close the section thereof so that there is no longer any passage of liquid (FIG. 6).

In said condition, there occurs an instantaneous increase in the pressure on the male element 18, which also overcomes the thrust of the anti-flooding elastic element 36, enabling the anti-flooding open/close element 28 to close the anti-flooding seat 30, thus interrupting immediately supply of the liquid through the outlet passage 12*b*.

With the provision also of the retention open/close element 44, the anti-flooding device is able to perform the supplementary function of retention and non-return preventing any reflux of the liquid in the case where there were any interruption in delivery.

Figure 9:
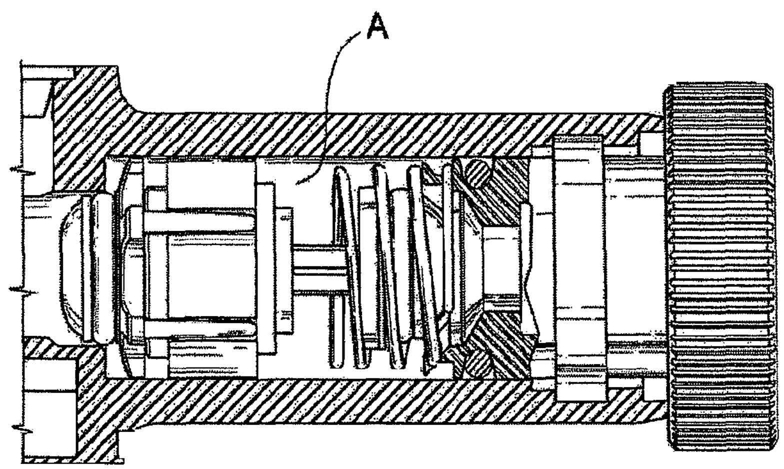
FIG. 9 is a partially sectioned schematic view of an anti-flooding device according to the invention in a possible condition of operation.

The retention open/close element 44 preferably associated to the male element 18 is pushed against the retention seat 46 by the hydrostatic pressure assumed by the water already delivered, i.e., downstream of the anti-flooding device and, for example, designated by the reference A in FIG. 9.

From the above description it may be appreciated how the provision of an anti-flooding device according to the present invention enables immediate interruption of delivery of liquid thus preventing any unpleasant drawbacks.

In addition, the anti-flooding device according to the invention can provide also a non-return function to be carried out, thus preventing any reflux of liquid in the case of interruption in delivery.

It is clear that variations and/or additions can be made to what is described and illustrated above.

For example, the wedges could have a constant cross section, whilst the slots could have a cross section that varies in the longitudinal direction of the duct in such a way as to obtain the effect of closing of the section of passage described previously, or else both the wedges and the slots can present a cross section that varies in the longitudinal direction of the duct.

Modifications, adaptations, and replacements of elements with other functionally equivalent ones may be made to the embodiments of the device described above by any person skilled in the branch in order to meet contingent requirements, without this implying any departure from the scope of the ensuing claims. Each of the characteristics described as belonging to a possible embodiment can be implemented independently of the other embodiments described.

The invention claimed is:

1. An anti-flooding device comprising:

a duct for passage of a flow of liquid;

limiting means inserted along the duct and defining a section of passage of the liquid that decreases progressively as the flowrate of liquid increases, wherein the duct closes once a given threshold flowrate has been reached;

an anti-flooding open/close element associated with said limiting means and an anti-flooding seat set along said duct for passage of liquid;

wherein the limiting means comprise at least one male element and at least one female element, wherein the male element and the female element are mobile with respect to one another so that they slide into one another as the flowrate of liquid increases, progressive insertion into one another of said male element and said female element defining said section of passage; and wherein the male element and female element are shaped with respect to one another so as to reduce said section of passage as the flowrate of liquid increases, wherein the duct for passage of liquid closes as soon as a given threshold flowrate is reached.

2. The anti-flooding device according to claim 1, further comprising an elastic retention element set between said male element and said female element.

3. The anti-flooding device according to claim 1, wherein said male element comprises at least one wedge with cross section increasing in a direction opposite to the normal flow of liquid, which is designed to insert in a corresponding slot of said female element.

4. The anti-flooding device according to claim 3, wherein said at least one slot is made in an external surface of said female element.

5. The anti-flooding device according to claim 4, wherein said female element comprises two or more slots distributed along the external surface of the female element.

6. The anti-flooding device according to claim 1, wherein said anti-flooding open/close element closes said anti-flooding seat under the action of the thrust exerted by said limiting means once said threshold flowrate is exceeded.

7. The anti-flooding device according to claim 1, wherein said anti-flooding open/close element is associated with one of said male element and said female element.

8. The anti-flooding device according to claim 7, wherein said anti-flooding open/close element is associated with one of between said male element and said female element by a stem set along said duct for passage of liquid.

9. The anti-flooding device according to claim 7, wherein said anti-flooding open/close element is connected to said male element, wherein said male element is mobile with respect to said female element until said threshold flowrate is reached.

10. The anti-flooding device according to claim 1, further comprising an anti-flooding elastic element acting to maintain said anti-flooding seat open.

11. The anti-flooding device according to claim 10, wherein said anti-flooding elastic element is set between a portion of the duct for passage of liquid and said limiting means.

12. The anti-flooding device according to claim 10, wherein said anti-flooding elastic element is set between said duct for passage of liquid and said female element of said limiting means.

13. The anti-flooding device according to claim 10, wherein said anti-flooding elastic element is pre-loaded in a condition of rest or normal use of the apparatus set downstream of the anti-flooding device.

14. The anti-flooding device according to claim 10, comprising an elastic retention element set between said male element and said female element, wherein said anti-flooding elastic element has a greater stiffness than said elastic retention element.

15. The anti-flooding device according to claim 1, further comprising a valve associated with a downstream end of said duct for passage of liquid and defining said anti-flooding seat.

16. The anti-flooding device according to claim 15, wherein the position of said valve is adjustable along said duct for passage of liquid.

17. The anti-flooding device according to claim 1, wherein said limiting means comprise a retention open/close element and wherein said duct for passage of liquid comprises a retention seat set upstream of said limiting means with reference to the normal flow of the liquid, said retention open/close element being designed to close said retention seat once the flow of liquid ceases.

18. The anti-flooding device according to claim 17, wherein said retention open/close element is connected to said male element of said limiting means.

19. A connection device for a dispenser for drinking water, comprising a pressure limiter and an anti-flooding device according to claim 1.

* * * * *